United States Patent
Mitteregger et al.

[11] Patent Number: 6,082,992
[45] Date of Patent: Jul. 4, 2000

[54] APPARATUS FOR INJECTION MOLDING BENT PIPE MADE OF PLASTIC MATERIAL

[75] Inventors: Erich Mitteregger; Ernst Schwaiger, both of Micheldorf, Austria

[73] Assignee: IFW-Manfred Otte Gesellschaft m.b.H & Co. KG., Micheldorf, Austria

[21] Appl. No.: 09/153,894

[22] Filed: Sep. 16, 1998

[30] Foreign Application Priority Data

Sep. 16, 1997 [EP] European Pat. Off. ............ 97116065

[51] Int. Cl.⁷ .................................................. B29C 45/40
[52] U.S. Cl. ........................... 425/556; 425/442; 425/577
[58] Field of Search .................................. 425/556, 577, 425/438, 442; 249/184

[56] References Cited

U.S. PATENT DOCUMENTS

| | | |
|---|---|---|
| 3,095,613 | 7/1963 | Christensen et al. . |
| 3,152,365 | 10/1964 | Fisher . |
| 3,545,718 | 12/1970 | Shale ....................................... 249/184 |
| 3,752,438 | 8/1973 | Baillie ...................................... 249/184 |
| 4,184,834 | 1/1980 | Barber . |

FOREIGN PATENT DOCUMENTS

| | | |
|---|---|---|
| 94 14 523 | 12/1994 | Germany . |
| 85/04604 | 10/1985 | WIPO . |

*Primary Examiner*—Tim Heitbrink
*Attorney, Agent, or Firm*—Wenderoth, Lind & Ponack, L.L.P.

[57] ABSTRACT

An apparatus for injection molding bent pipe made of plastic material which has a bend part (8) with an arcuate centerline and with uniform internal cross-section, and cylindrical connecting parts (9, 22) adjoining the bend part at one or both sides. The connecting parts (9, 22) have larger internal cross-section than the bend part (8). The apparatus includes an injection mold which can be divided along a plane containing an arcuate centerline of the bend part into at least two outer mold portions which form a mold cavity. The injection mold includes a bend core with a pivotal member (5) which is pivotable along the arcuate centerline of the bend part and a cylindrical core (13) which is displaceable axially along its centerline, for each connecting part (9, 22). The apparatus includes two bars (1, 2) which are spaced from each other in the plane containing the arcuate centerline and whose respective pivotal mounting points (3, 4) on the pivotal member (5) are guided in the bend part (8) on circular paths about an axis of curvature (K) and in the connecting part (9) adjoining same in parallel relationship therewith.

9 Claims, 3 Drawing Sheets

APPARATUS FOR INJECTION MOLDING BENT PIPE MADE OF PLASTIC MATERIAL

BACKGROUND OF THE INVENTION

The invention concerns an apparatus for injection molding a bent pipe (pipe bend) made of plastic material. The pipe has a bend part with an arcuate centerline and a uniform internal cross-section, and the pipe has cylindrical connecting parts which are connected to the bend part at one or both sides of the bend part. The connecting parts have larger internal cross-sections than the bend part. The apparatus includes an injection mold which can be divided along a plane containing the arcuate centerline of the bend part into at least two outer mold portions forming a mold cavity. The injection mold includes a bend core with a pivotal member which is pivotable along the arcuate centerline of the bend part (region) and a cylindrical core which is displaceable axially along its centerline (for each connecting part). A displacement device moves of the pivotal member. The displacement device includes a bar to pivot the pivotal member, and the bar is longitudinally displaceable in the connecting part.

U.S. Pat. No. 4,184,834 discloses an apparatus for the production of a bent pipe. The pipe includes a bend part with an arcuate centerline and a uniform internal cross-section, and two enlarged connecting parts adjoining the same. A bend core portion is hingedly connected to a connecting part core portion. When the bend portion is introduced into a mold or the pipe is removed from the mold, the bend core portion must find its own way along the mold cavity or along the internal wall surface of the pipe. It is only when all of the core portions are assembled that the bend core portion is centered in the mold. A sectional plane between the cylindrical connecting part core portion and the hingedly mounted bend core portion extends into the bend part.

In the known apparatus, the connecting parts are short and wide so that removal of the bend core portion from the finished pipe can only be done by pivoting the curved bend part about the center of curvature thereof.

SUMMARY OF THE INVENTION

In comparison with a known apparatus, an object of the present invention is to make it possible to produce a bent pipe in which a cylindrical connecting portion of any length adjoins a bend (curved) part. A displacement device includes two bars which are spaced apart from each other in a bend plane (a plane containing an arcuate centerline of the bend part). Respective pivotal mounting points of the bars on a pivotal member are guided in a bend part along circular paths about an axis of curvature and in the connecting part adjoining same parallel thereto.

DESCRIPTION OF THE PREFERRED EMBODIMENTS

Figure 1:
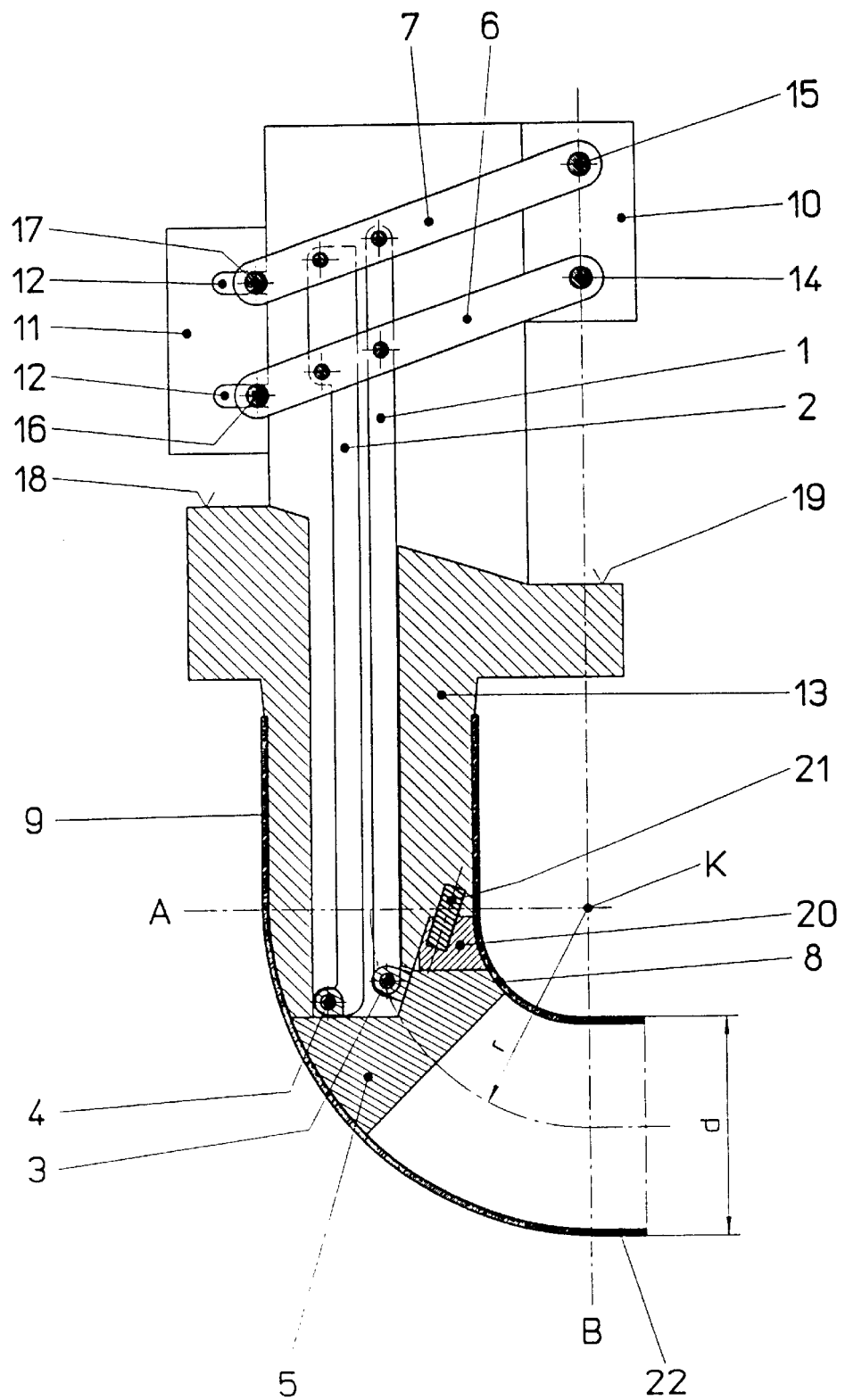
FIG. 1 shows a sectional view of a mold core in accordance with the present invention.

Details of a possible structural implementation of this invention are discussed by means of a specific embodiment.

It is assumed for the invention that cylindrical connecting parts have larger diameters than a bend part of a pipe. However, for reasons relating to flow dynamics, this difference should be as small as possible. A long connecting part is primarily created by virtue of the fact that a pivotal member, in an inserted condition, reaches only as far as the center of the bend part of the pipe. If a long connecting part is also to be connected to a second side of the bend part, the apparatus according to the present invention is arranged symmetrically in a duplicate configuration. Further, adaptation of the cross-sections of the connecting parts to the bend part is achieved if the bend core includes, in addition to the pivotal member, a slider which is disposed at a radially inward side of the bend part. The slider is displaceable in a direction towards the axis of the connecting part when the cylindrical core is pulled out. A measure which is already known from U.S. Pat. No. 4,184,834, of causing the cylindrical core to project into the outward side of the curved pipe part, acts in a similar manner.

An embodiment of the invention is illustrated in the drawings in a section taken along a central plane of a bent pipe which show three conditions of movement of the mold core.

FIG. 1 shows the mold core according to the invention during injection molding. The pipe comprises a bend part 8 in the form of a pipe segment, and long and short connecting parts 9, 22 respectively, adjoining the bend part 8. A mold cavity of an injection mold has portions corresponding to the bend part 8 and the connecting parts 9, 22. The mold core comprises three parts, namely a cylindrical core 13, a pivotal member 5 and a slider 20. Disposed between the cylindrical core 13 and the slider 20 is a spring 21 which urges the slider 20 towards an axis of the connecting part 9.

The bend part 8 is curved with a radius r about an axis of curvature which passes through the plane of the drawing at point K. Diameter d of the injection mold corresponds to the radius of curvature r, which however is not a prerequisite for proper functioning of the invention. On the contrary, a particular advantage of the invention is that it is possible to operate the apparatus with a relatively large radius of curvature r.

Bars 1 and 2 are connected by way of pivot axes 3 and 4 (mounting points) to pivotal member 5. The pivot axes 3 and 4 are disposed in a radial plane that passes through the axis of curvature K.

After opening of an outer mold, removal of the pipe (molding) from the mold is accomplished in three separate phases. The first phase can be seen in FIG. 2. In this case, the cylindrical core 13 is pulled out in the axial direction until it comes to bear against a guide block 11 with an abutment 18. In this situation the pivotal member 5 remains in its original position whereas the slider 20, under the influence of the expanding spring 21, slides in the axial direction on the pivotal member 5 and thus comes to lie entirely within the cylindrical cross-section of the pipe.

Figure 2:
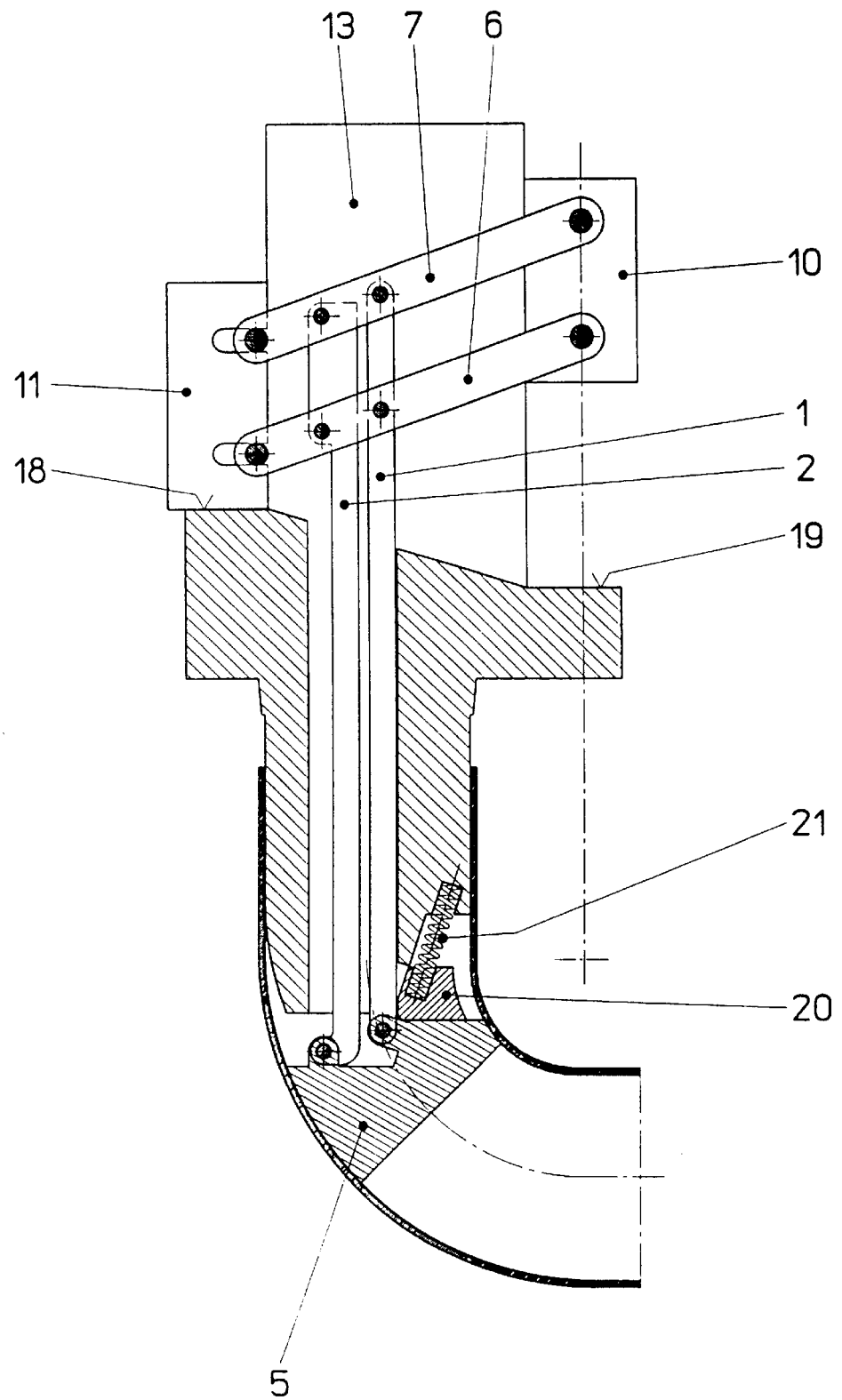
FIG. 2 shows a sectional view of the mold core in a transition position.
Figure 3:
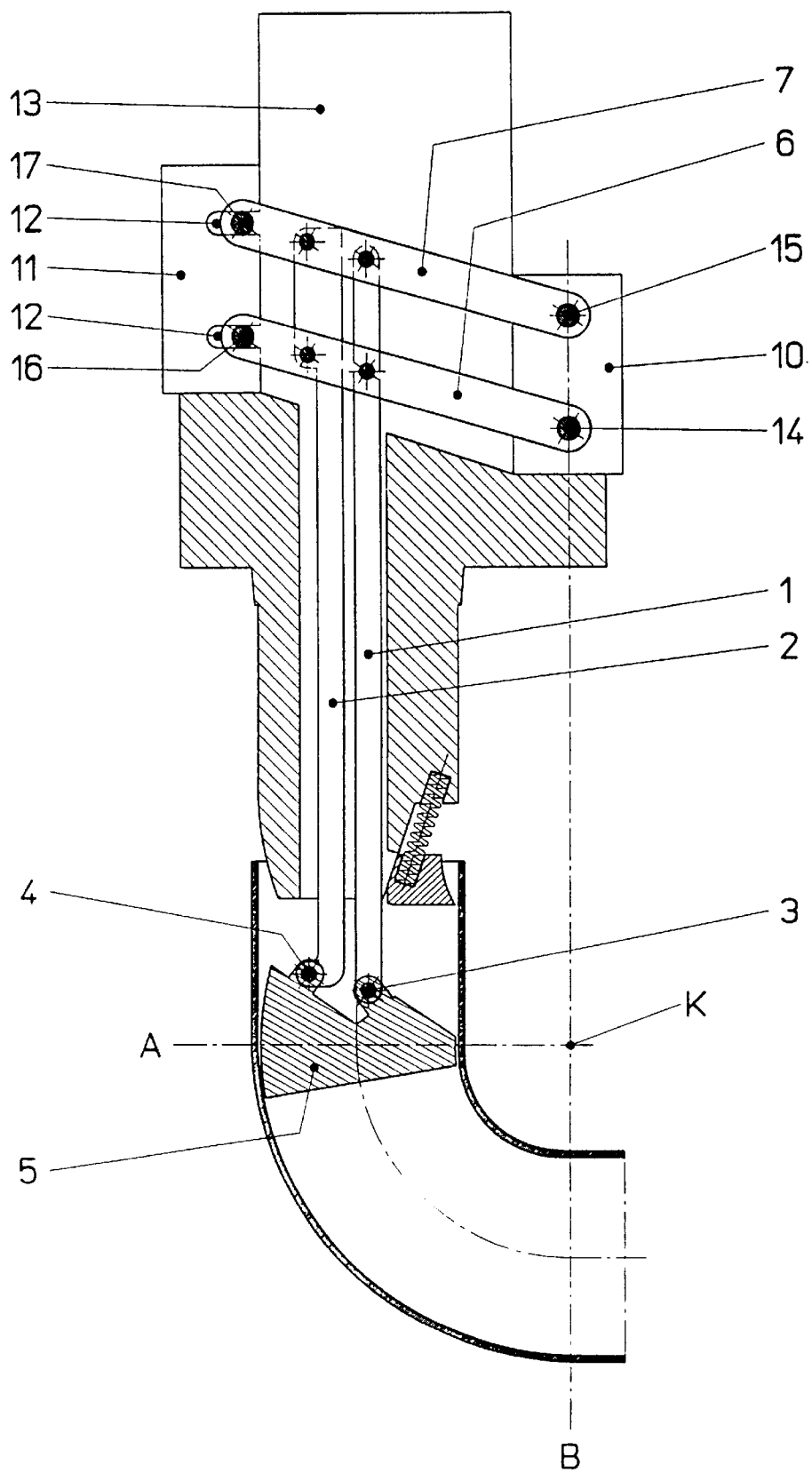
FIG. 3 shows a sectional view of the mold core in another position.

In the transition from the position shown in FIG. 2 into the position shown in FIG. 3, the cylindrical core 13 is further withdrawn. This movement also moves the guide block 11. As a guide block 10 remains stationary, this causes pivotal movement of bar members 6 and 7. The bar members 6 and 7 pull out the bars 1 and 2, and in so doing move the pivotal member 5 out of the bend part 8 and into the connecting part 9. So that this is possible, the connecting part 9 must have a slightly larger cross-section than the bend part 8.

In the transition the position shown in FIG. 2 to the position shown in FIG. 3, axes 3 and 4 of the pivotal member 5 move in circular arcs around the axis of curvature passing through K. The bar members 6 and 7 are pivoted to the same extent about axes 14 and 15. The extent of the pivotal movement is determined by the displacement of the guide block 11. Free ends 16 and 17 of the bar members 6 and 7 are mounted in slots 12 of the guide block 11.

Upon further movement of the core assembly in the axial direction (as illustrated in FIG. 3), the entire core becomes entirely free from the connecting part 9. The guide blocks 10 and 11 are pushed by abutments 18 and 19 on the cylindrical core 13.

As is shown for example in DE-U 94 14 523, control of the movement of the individual core parts can be done purely mechanically by using a slider guide which has guide slots with which the components 10 and 11 to be displaced are in engagement with the slider guide by way of lateral projections. It is equally well possible to use electric or hydraulic drive means for moving the bars 1, 2 through the described sequence of motions (and back again).

In the illustrated embodiment a slight difference (about 5%) is achieved as between the diameters of the connecting part 9 and the bend part 8. That is attributed to the fact that the pivotal member 5 only projects into that half of the bend part 8, which is adjacent to the long connecting part 9. A further improvement is afforded by virtue of the fact that the pivotal member 5 has a cross-sectional shape which is approximately in the form of a sector of a circle. This is made possible by the described arrangement of the slider 20. A reduction in the angle through which the pivotal member 5 has to be pivoted is also afforded by virtue of the cylindrical core 13 partially extending into the bend part 8 defined by line A-K-B.

What is claimed is:

1. An apparatus for injection molding a bent pipe, comprising:

an injection mold adapted to define a mold cavity which includes a bend part with an arcuate centerline curved about an axis of curvature and a connecting part connected to one end of said bent part, wherein said mold includes a bend core, wherein said bend core includes a pivotal member adapted to be pivotal along said arcuate centerline of said bend part and a cylindrical core adapted to be axially displaceable within said connecting part; and a displacement device for moving said pivotal member, wherein said displacement device includes at least two bars which are longitudinally displaceable in said connecting part, wherein said bars are spaced apart from each other in a plane containing said arcuate centerline, wherein said bars have respective mounting points at which said bars are pivotally mounted to said pivotal member such that said mounting points can be guided in a part of the pipe formed in said bend part along respective circular paths about said axis of curvature and can be axially guided within a part of the pipe formed at said connecting part.

2. An apparatus according to claim 1, further comprising at least two bar members coupled to said bars for guiding said bars, wherein said bar members have respective pivot axes disposed in a plane containing said axis of curvature such that said bar members pivotally move jointly.

3. An apparatus according to claim 2, further comprising a first guide block and a second guide block, wherein said pivot axes are pivotally provided on said first guide block, wherein said second guide block includes at least two slots, and wherein said bar members have free ends respectively provided in a parallel relationship in said slots.

4. An apparatus according to claim 3, wherein said cylindrical core includes at least two abutments for contacting said first and second guide blocks when said cylindrical core is axially displaced in said connecting part.

5. An apparatus according to claim 1, wherein said pivotal member projects into only half of said bend part when inserted in said mold cavity.

6. An apparatus according to claim 1, further comprising a slider provided on said cylindrical core at a radially inward side of said bend part with respect to said axis of curvature such that when said cylindrical core is pulled out of the pipe said slider slides along said cylindrical core and said pivotal member in a direction towards a centerline of said connecting part.

7. An apparatus according to claim 6, further comprising a spring provided between sad cylindrical core and said slider for urging said slider towards said centerline of said connecting part.

8. An apparatus according to claim 1, wherein said cylindrical core projects into said bend part at a radially outer side of said bend part.

9. An apparatus according to claim 1, wherein said mold includes at least two outer mold portions, wherein said at least two outer mold portions are divided along said plane containing said arcuate centerline.

* * * * *